(12) United States Patent
Lacy et al.

(10) Patent No.: US 8,651,805 B2
(45) Date of Patent: Feb. 18, 2014

(54) HOT GAS PATH COMPONENT COOLING SYSTEM

(75) Inventors: Benjamin Paul Lacy, Greer, SC (US); Ronald Scott Bunker, Niskayuna, NY (US); Gary Michael Itzel, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 972 days.

(21) Appl. No.: 12/765,372

(22) Filed: Apr. 22, 2010

(65) Prior Publication Data
US 2011/0259017 A1 Oct. 27, 2011

(51) Int. Cl.
*F01D 25/14* (2006.01)

(52) U.S. Cl.
USPC .......................................... 415/178

(58) Field of Classification Search
USPC ........ 415/115, 177, 178; 416/95, 96 R, 97 R, 416/97 A
See application file for complete search history.

(56) References Cited

U.S. PATENT DOCUMENTS

| | | | |
|---|---|---|---|
| 3,584,972 A * | 6/1971 | Bratkovich et al. ........ | 416/229 R |
| 3,606,572 A * | 9/1971 | Schwedland ............... | 416/90 R |
| 3,606,573 A * | 9/1971 | Emmerson et al. ......... | 416/90 R |
| 3,864,199 A * | 2/1975 | Meginnis ................... | 428/596 |
| 4,118,146 A * | 10/1978 | Dierberger ................. | 416/97 A |
| 4,168,348 A * | 9/1979 | Bhangu et al. ............. | 428/573 |
| 4,311,433 A | 1/1982 | Bratton et al. | |
| 4,376,004 A * | 3/1983 | Bratton et al. ............ | 156/89.27 |
| 4,768,700 A * | 9/1988 | Chen ........................... | 228/159 |
| 4,798,514 A * | 1/1989 | Pask ............................. | 415/115 |
| 5,223,320 A * | 6/1993 | Richardson .................. | 428/137 |
| 5,626,462 A | 5/1997 | Jackson et al. | |
| 5,640,767 A | 6/1997 | Jackson et al. | |
| 6,461,107 B1 | 10/2002 | Lee et al. | |
| 6,461,108 B1 | 10/2002 | Lee et al. | |
| 6,499,949 B2 | 12/2002 | Schafrik et al. | |
| 6,511,762 B1 * | 1/2003 | Lee et al. ..................... | 428/697 |
| 6,528,118 B2 * | 3/2003 | Lee et al. ..................... | 427/258 |
| 6,551,061 B2 * | 4/2003 | Darolia et al. ............. | 416/97 A |
| 6,582,194 B1 | 6/2003 | Birkner et al. | |
| 6,617,003 B1 * | 9/2003 | Lee et al. ..................... | 428/131 |
| 6,761,031 B2 * | 7/2004 | Bunker ........................ | 60/752 |
| 6,905,302 B2 * | 6/2005 | Lee et al. ..................... | 415/115 |
| 7,413,406 B2 * | 8/2008 | Pietraszkiewicz et al. . | 416/96 R |
| 2006/0099080 A1 * | 5/2006 | Lee et al. ................... | 416/241 R |
| 2006/0222497 A1 * | 10/2006 | Lee ............................. | 416/97 R |
| 2007/0201980 A1 * | 8/2007 | Morris et al. ............... | 416/97 R |

* cited by examiner

*Primary Examiner* — Edward Look
*Assistant Examiner* — Aaron R Eastman
(74) *Attorney, Agent, or Firm* — Dority & Manning, PA

(57) ABSTRACT

A cooling system for a hot gas path component is disclosed. The cooling system may include a component layer and a cover layer. The component layer may include a first inner surface and a second outer surface. The second outer surface may define a plurality of channels. The component layer may further define a plurality of passages extending generally between the first inner surface and the second outer surface. Each of the plurality of channels may be fluidly connected to at least one of the plurality of passages. The cover layer may be situated adjacent the second outer surface of the component layer. The plurality of passages may be configured to flow a cooling medium to the plurality of channels and provide impingement cooling to the cover layer. The plurality of channels may be configured to flow cooling medium therethrough, cooling the cover layer.

19 Claims, 6 Drawing Sheets

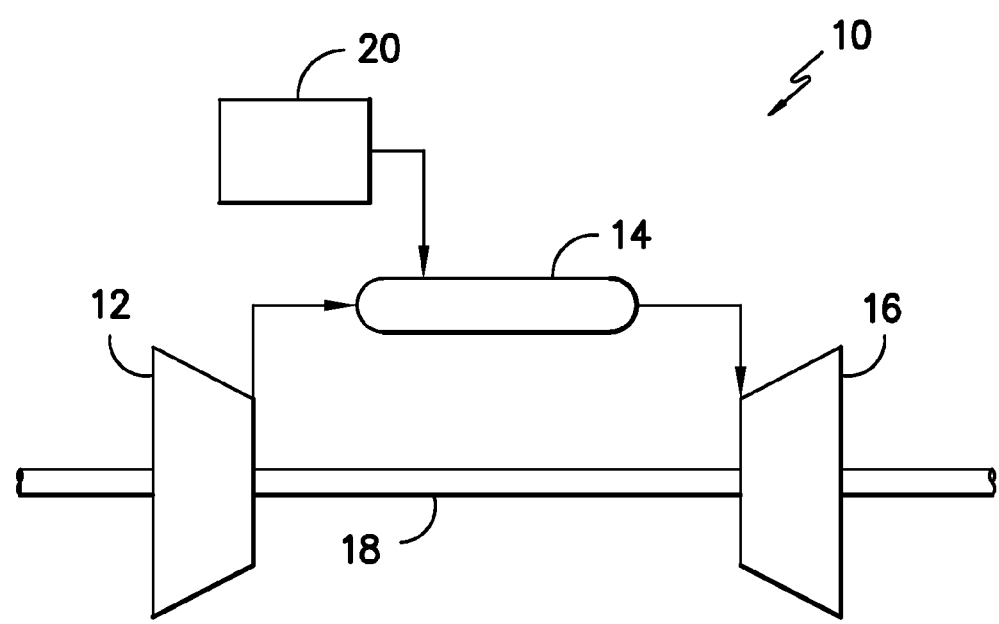
FIG. -1-

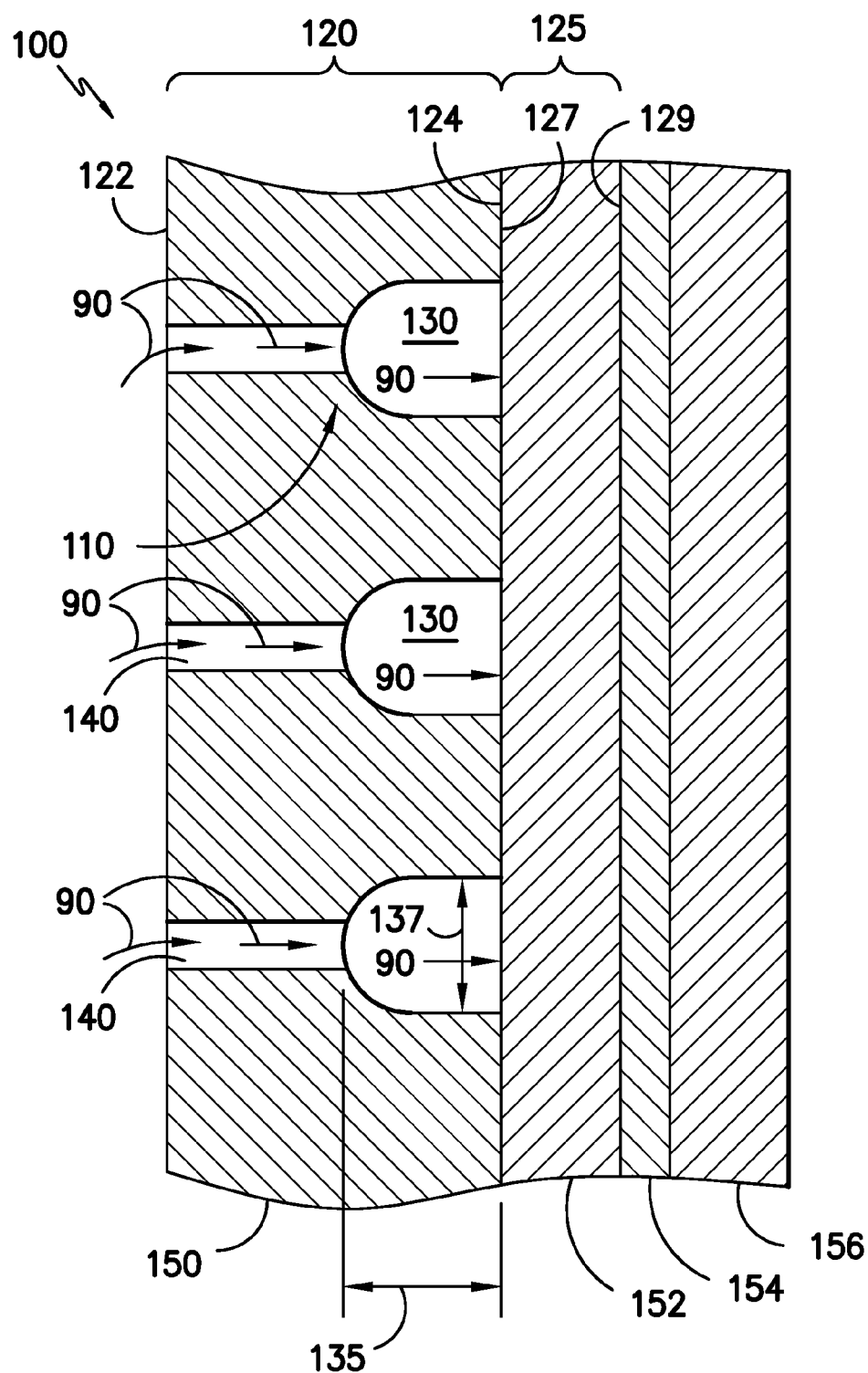
FIG. -2-

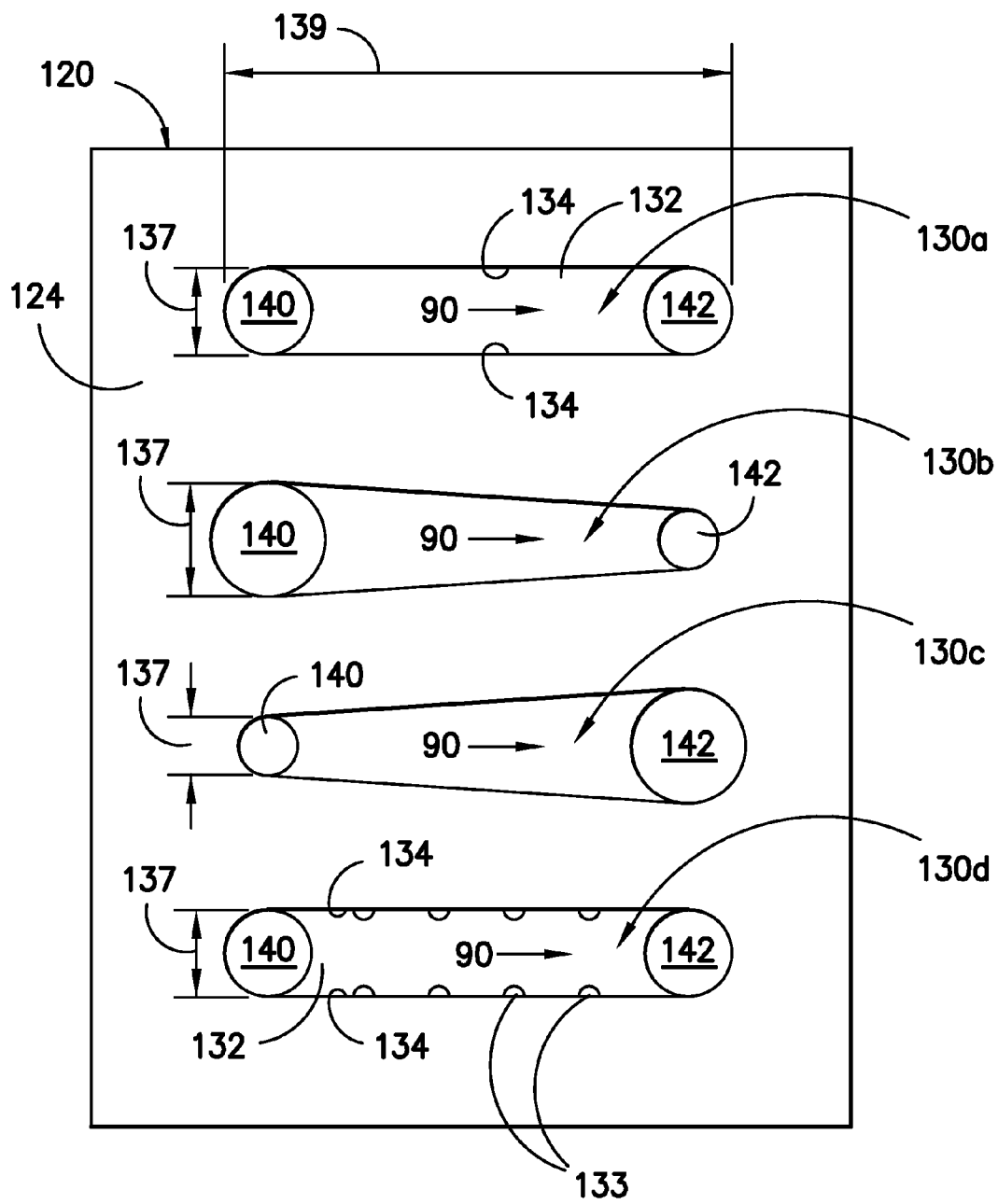
FIG. -3-

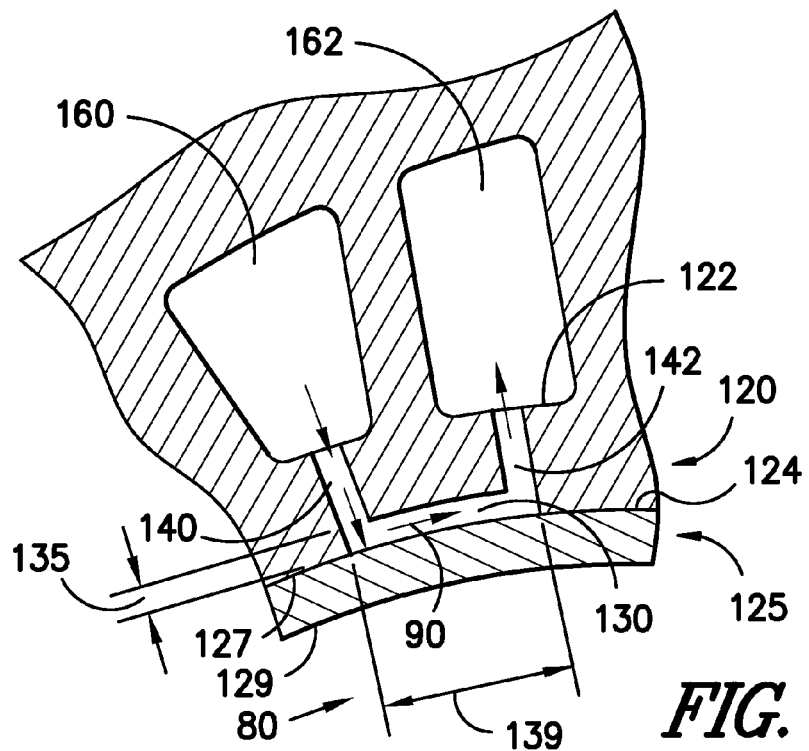
FIG. -4-
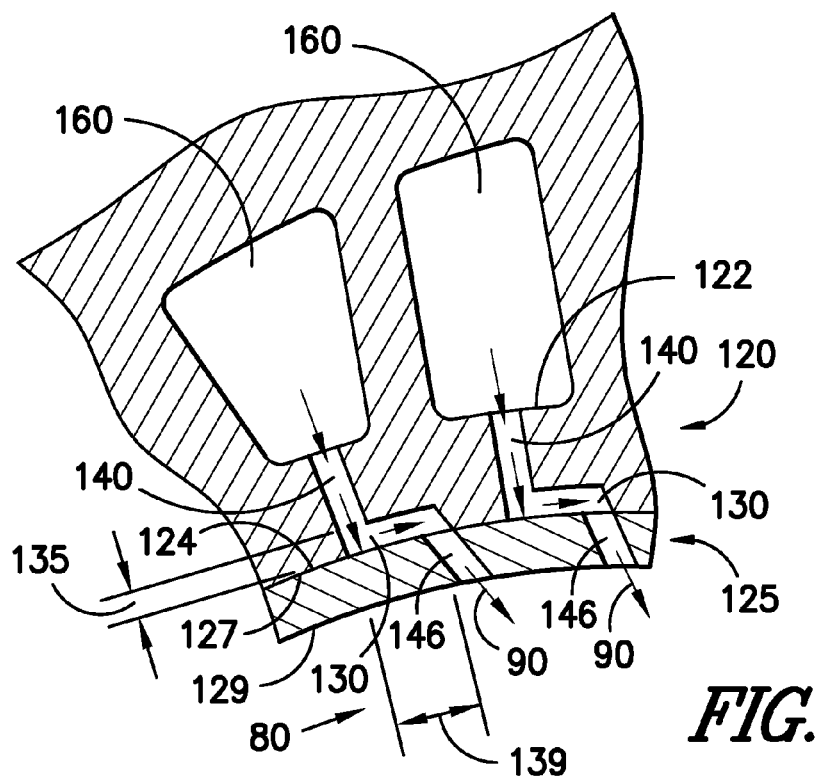
FIG. -5-

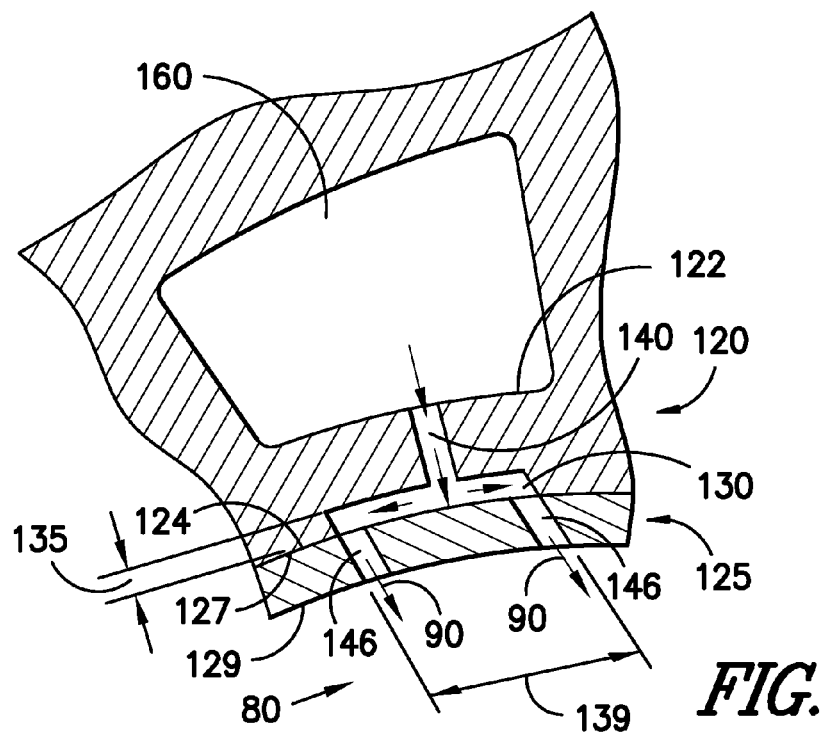
FIG. -6-
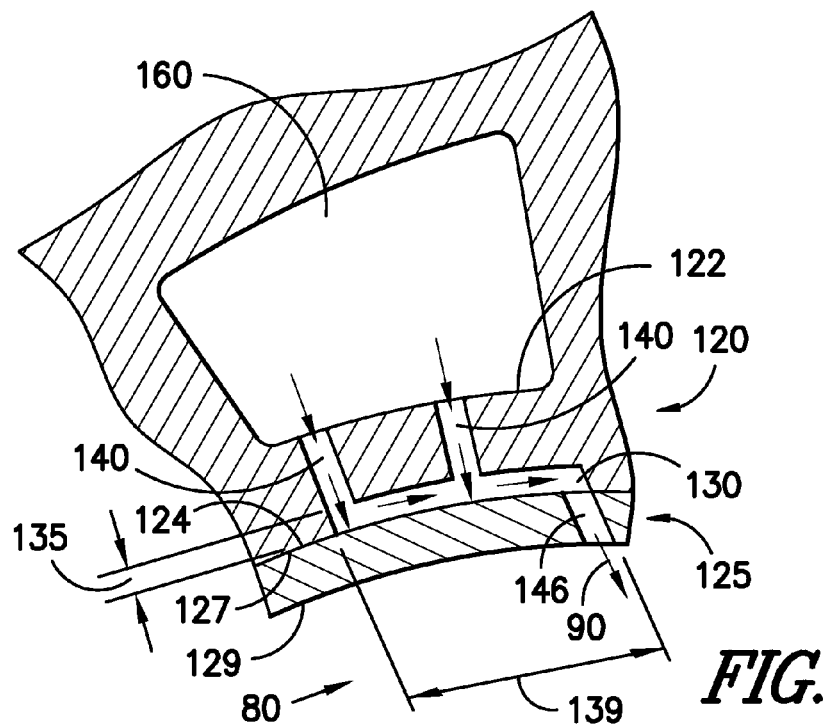
FIG. -7-

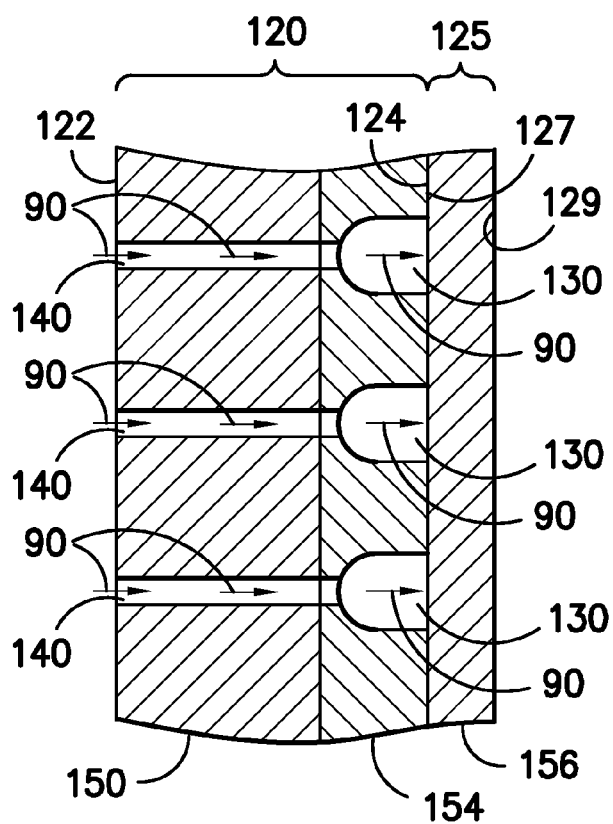
FIG. -8-
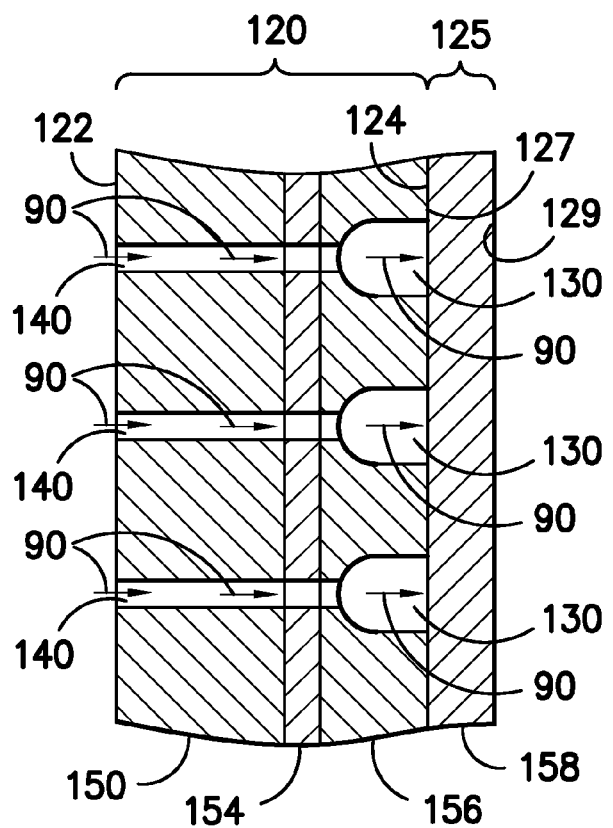
FIG. -9-

HOT GAS PATH COMPONENT COOLING SYSTEM

FEDERAL RESEARCH STATEMENT

This invention was made with Government support under contract number DE-FC26- 05NT42643 awarded by the Department of Energy. The Government may have certain rights in the invention.

FIELD OF THE INVENTION

The subject matter disclosed herein relates generally to gas turbine systems, and more particularly to apparatus for cooling a hot gas path component in a gas turbine system.

BACKGROUND OF THE INVENTION

Gas turbine systems are widely utilized in fields such as power generation. A conventional gas turbine system includes a compressor, a combustor, and a turbine. During operation of the gas turbine system, various components in the system are subjected to high temperature flows, which can cause the components to fail. Since higher temperature flows generally result in increased performance, efficiency, and power output of the gas turbine system and are thus desired in a gas turbine system, the components that are subjected to high temperature flows must be cooled to allow the gas turbine system to operate with flows at increased temperatures.

Various strategies are known in the art for cooling components that are subjected to high temperature flows. These components are typically known as hot gas path components. For example, a series of internal cooling passages, or serpentines, may be formed in a hot gas path component. A cooling fluid may be provided to the serpentines from a plenum, and the cooling fluid may flow through the passages, cooling the hot gas path component substrate and coatings. However, this cooling strategy typically results in comparatively low heat transfer rates and non-uniform component temperature profiles.

Thus, an improved cooling system for a hot gas path component would be desired in the art. For example, a cooling system that provides high heat transfer rates and relatively uniform temperature profiles would be advantageous. Further, a cooling system that utilizes backside impingement cooling to provide cooling fluid to a cooling channel and then allows the cooling fluid to flow through the channels, cooling the cover layer at an increased heat transfer rate and with a relatively uniform temperature profile, would be advantageous.

BRIEF DESCRIPTION OF THE INVENTION

Aspects and advantages of the invention will be set forth in part in the following description, or may be obvious from the description, or may be learned through practice of the invention.

In one embodiment, a cooling system for a hot gas path component is disclosed. The cooling system may include a component layer and a cover layer. The component layer may include a first inner surface and a second outer surface. The second outer surface may define a plurality of channels. The component layer may further define a plurality of passages extending generally between the first inner surface and the second outer surface. Each of the plurality of channels may be fluidly connected to at least one of the plurality of passages. The cover layer may be situated adjacent the second outer surface of the component layer. The plurality of passages may be configured to flow a cooling medium to the plurality of channels and provide impingement cooling to the cover layer. The plurality of channels may be configured to flow cooling medium therethrough, cooling the cover layer.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a schematic illustration of a gas turbine system;

FIG. 2 is a cross-sectional view of one embodiment of the hot gas path component cooling system of the present disclosure;

FIG. 3 is a front view of a component layer including various embodiments of the channel of the present disclosure;

FIG. 4 is a plan view of one embodiment of the hot gas path component cooling system of the present disclosure;

FIG. 5 is a plan view of another embodiment of the hot gas path component cooling system of the present disclosure;

FIG. 6 is a plan view of yet another embodiment of the hot gas path component cooling system of the present disclosure;

FIG. 7 is a plan view of yet another embodiment of the hot gas path component cooling system of the present disclosure;

FIG. 8 is a cross-sectional view of another embodiment of the hot gas path component cooling system of the present disclosure; and FIG. 9 is a cross-sectional view of yet another embodiment of the hot gas path component cooling system of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 is a schematic diagram of a gas turbine system 10. The system 10 may include a compressor 12, a combustor 14, a turbine 16, and a fuel nozzle 20. Further, the system 10 may include a plurality of compressors 12, combustors 14, turbines 16, and fuel nozzles 20. The compressor 12 and turbine 16 may be coupled by a shaft 18. The shaft 18 may be a single shaft or a plurality of shaft segments coupled together to form shaft 18.

The gas turbine system 10 may include a plurality of hot gas path components 100. A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and compressor exhaust components are all hot gas path components. However, it should be understood that the hot gas path component 100 of the present invention is not limited to the above examples, but may be any component that is at least partially exposed to a high temperature flow of gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow 80, the hot gas path component 100 is heated by the hot gas flow 80 and may reach a temperature at which the hot gas path component 100 fails. Thus, in order to allow system 10 to operate with hot gas flow 80 at a high temperature, increasing the efficiency and performance of the system 10, a cooling system for the hot gas path component 100 is required.

In general, the cooling system of the present disclosure includes a series of small channels, or microchannels, formed in the surface of the hot gas path component 100. The hot gas path component may be provided with a cover layer. A cooling fluid may be provided to the channels from a plenum, and the cooling fluid may flow through the channels, cooling the cover layer. Further, the cooling system may utilize backside impingement cooling to provide cooling fluid to the cooling channels and then allow the cooling fluid to flow through the channels, cooling the cover layer at an increased heat transfer rate and with a relatively uniform temperature profile.

FIG. 2 illustrates an exemplary embodiment of a cooling system 110 for a hot gas path component 100 of the present disclosure. The cooling system 110 may include, for example, a component layer 120 and a cover layer 125. The component layer 120 may include a first inner surface 122 and a second outer surface 124. The cover layer 125 may include a first inner surface 127 and a second outer surface 129. The cover layer 125 may be situated adjacent the component layer 120. For example, the cover layer 125, such as the first inner surface 127, may be situated adjacent the second outer surface 124 of the component layer 120.

The component layer 120 may define a plurality of channels 130. The channels may be configured to flow a cooling medium 90 therethrough, cooling the cover layer 125 and component layer 120. For example, the channels 130 may be defined in the second outer surface 124 of the component layer 120. The cooling medium 90 flowing through the channels 130 may flow past and contact the cover layer 125, situated adjacent the component layer 120. The cooling medium 90 flowing through the channels 130 may thus cool the cover layer 125, as well as component layer 120, through convective cooling, transferring heat from the cover layer 125 to the cooling medium 90.

The channels 130 may be formed in the component layer 120 through, for example, laser machining, water jet machining, electro-chemical machining ("ECM"), electro-discharge machining ("EDM"), photolithography, or any other process capable of providing channels with proper sizes and tolerances.

The channels 130 may have depths 135 in the range from approximately 0.2 millimeters ("mm") to approximately 3 mm, such as from approximately 0.5 mm to approximately 1 mm. Further, the channels 130 may have widths 137 in the range from approximately 0.2 mm to approximately 3 mm, such as from approximately 0.5 mm to approximately 1 mm.

In an exemplary embodiment as shown in FIG. 3, for example, each of the plurality of channels 130 may have a width 137 and a length 139. As shown by channels 130a and 130d of FIG. 3, the width 137 of each of the plurality of channels 130 may be substantially constant throughout the length 139 of the channel. In another exemplary embodiment, however, the width 137 of each of the plurality of channels 130 may be tapered. For example, as shown by channel 130b of FIG. 3, the width 137 of each of the plurality of channels 130 may be reduced through the length 139 of the channel 130 in the direction of flow of the cooling medium 90 through the channel 130. Alternatively, however, as shown by channel 130c of FIG. 3, the width 137 of each of the plurality of channels 130 may be enlarged through the length 139 of the channel 130 in the direction of flow of the cooling medium 90 through the channel 130. It should be understood that the width 137 of each of the plurality of channels 130 may vary in any manner throughout the length 139 of the channel 130, being reduced and enlarged as desired. Further, it should be understood that various channels 130 may have substantially constant widths 137, while other channels 130 may have tapered widths 137.

In an exemplary embodiment, each of the plurality of channels 130 may have a depth 135 and a length 139. The depth 135 of each of the plurality of channels 130 may be substantially constant throughout the length 139 of the channel. In another exemplary embodiment, however, the depth 135 of each of the plurality of channels 130 may be tapered. For example, the depth 135 of each of the plurality of channels 130 may be reduced through the length 139 of the channel 130 in the direction of flow of the cooling medium 90 through the channel 130. Alternatively, however, the depth 135 of each of the plurality of channels 130 may be enlarged through the length 139 of the channel 130 in the direction of flow of the cooling medium 90 through the channel 130. It should be understood that the depth 135 of each of the plurality of channels 130 may vary in any manner throughout the length 139 of the channel 130, being reduced and enlarged as desired. Further, it should be understood that various channels 130 may have substantially constant depths 135, while other channels 130 may have tapered depths 135.

The channels 130 may have cross-sections with any geometric shape, such as, for example, a rectangle, an oval, a triangle, or any other geometric shape that will facilitate the flow of a cooling medium through the channel. It should be understood that various channels 130 may have cross-sections with a certain geometric shape, while other channels 130 may have cross-sections with another geometric shape.

The channels 130 may be generally straight channels, or may be generally curved, sinusoidal, or serpentine channels. The channels 130 may be oriented such that the cooling medium 90 flows through the channels 130 in any direction with respect to the hot gas flow 80. For example, the cooling medium 90 may flow through the channels 130 or any portion thereof in a generally downstream direction with respect to the hot gas flow 80, or in a generally upstream direction with respect to the hot gas flow 80, or in any other direction with respect to the hot gas flow 80. Further, as shown in FIG. 6, the cooling medium 90 may flow through the channels 130 in multiple directions.

In one embodiment, as shown by channel 130a in FIG. 3, each of the plurality of channels 130 may have a substantially smooth surface, such as a substantially smooth channel surface 132 and sidewalls 134. For example, the channel surface 132 and sidewalls 134 of each of the channels 130 may be substantially or entirely free of protrusions, recesses, or surface texture. In an alternative embodiment, as shown by channel 130*d* in FIG. 3, each of the plurality of channels 130 may have a surface, such as channel surface 132 and sidewalls 134, that includes a plurality of surface features 133. The surface features 133 may be discrete protrusions extending from the channel surface 132 or sidewalls 134. Further, the surface features 133 may extend between the channel surface 132 and sidewalls 134. For example, the surface features 133 may include fin-shaped protrusions, cylindrical-shaped protrusions, ring-shaped protrusions, chevron-shaped protrusions, raised portions between cross-hatched grooves formed within the channel 130, or any combination thereof, as well as any other suitable geometric shape. It should be understood that the dimensions of the surface features 133 may be selected to optimize cooling of the component layer 120 and the cover layer 125 while satisfying the geometric constraints of the channels 130. Further, it should be understood that the surface features may be included on the channel surface 132 only, the sidewalls 134 only, or both the channel surface 132 and the sidewalls 134. Additionally, it should be understood that the surface features 133 may, in some embodiments, be included on the inner surface 127 of the cover layer 125.

In some embodiments, each of the channels 130 may be singular, discrete channels. In other embodiments, however, each of the channels 130, or any portion of the channels 130, may branch off from single channels 130 to form multiple channel branches 130. It should further be understood that the channels 130 may, in some embodiments, wrap around the entire perimeter of a hot gas path component 100, or may wrap around only portions of the perimeter of a hot gas path component 100. However, it should further be understood that each of the channels 130 may generally not intersect with any other channel 130.

The component layer 120 may further define a plurality of passages 140. The passages 140 may extend generally through the component layer 120, such as between the first inner surface 122 and the second outer surface 124. The passages 140 may be fluidly connected to the channels 130. For example, each of the plurality of channels 130 may be fluidly connected to at least one of the plurality of passages 140. Further, in exemplary embodiments as shown in FIG. 7, each of the plurality of channels 130 may be fluidly connected to a plurality of passages 140. The passages 140 may be configured to flow the cooling medium 90 to the channels 130. For example, as shown in FIG. 4, at least one cooling circuit 160 may be defined within or provided adjacent to the hot gas path component 100, such as defined adjacent the first inner surface 122 of the component layer 120. The passages 140 may be fluidly connected to the at least one cooling circuit 160. Cooling medium 90 may flow through the cooling circuit 160 at a pressure generally higher than the pressure in the passages 140 and channels 130. This pressure differential may cause a portion of the cooling medium 90 contained within the cooling circuit 160 to flow into and through the passages 140, and from the passages 140 into and through the channels 130.

Further, each of the plurality of passages 140 may be configured to provide impingement cooling to the cover layer 125. For example, the passages 140 may be oriented generally perpendicularly within the component layer 120 with respect to the first inner surface 127 of the cover layer 125. Thus, as cooling medium 90 flows through the passages 140 and is provided to the channels 130, the cooling medium 90 is exhausted from the passages 140 and impinges on the first inner surface 127 of the cover layer 125, providing impingement cooling of the cover layer 125.

After the cooling medium 90 flows through the channels 130, cooling the cover layer 125 and the component layer 120, the cooling medium 90 may be exhausted from the channels 130. For example, in one embodiment as shown in FIG. 4, the cooling medium 90 may be exhausted adjacent the first inner surface 122 of the component layer 120. The plurality of passages 140 may be a plurality of first passages 140, and the component layer 120 may further define a plurality of second passages 142. The second passages 142 may be configured to flow the cooling medium 90 from the plurality of channels 130 and exhaust the cooling medium 90 adjacent the first inner surface 122 of the component layer 120. For example, similar to the first passages 140, the second passages 142 may extend generally between the first inner surface 122 and the second outer surface 124 of the component layer 120, and may be fluidly connected to the channels 130. Further, the at least one cooling circuit 160 may be a first cooling circuit 160, and at least one second cooling circuit 162 may be defined within or provided adjacent to the hot gas path component 100, such as defined adjacent the first inner surface 122 of the component layer 120. The second cooling circuit 162 may be disposed generally downstream of the first cooling circuit 160 in the direction of flow of the cooling medium 90. The second passages 142 may be fluidly connected to the at least one second cooling circuit 162. Because the second cooling circuit 162 is disposed generally downstream of the first cooling circuit 160, cooling medium 90 may flow through the second cooling circuit 162 at a pressure generally lower than the pressure in the first passages 140, channels 130, and second passages 142. This pressure differential may cause the cooling medium 90 flowing through the channels 130 to flow from the channels 130 into and through the second passages 142 and exhaust from the second passages 142 adjacent the first inner surface 122, such as into the second cooling circuit 162. It should be understood that each channel 130 may be connected to one or more of the second passages 142. It should further be understood that the second passages 142 may be oriented at any angle with respect to the channels 130. Additionally, it should be understood that the second passages 142 may have generally circular or oval cross-sections, generally rectangular cross-sections, generally triangular cross-sections, or may have any other suitable shaped polygonal cross-sections.

Alternatively, in another embodiment as shown in FIGS. 5, 6 and 7, the cooling medium 90 may be exhausted adjacent the cover layer 125, such as adjacent the second outer surface 129 of the cover layer 125. For example, the cover layer 125 may define a plurality of exhaust passages 146. Each of the exhaust passages 146 may be configured to flow the cooling medium 90 from the plurality of channels 130 and exhaust the cooling medium 90 adjacent the second outer surface 129 of the cover layer 125. For example, the exhaust passages 146 may extend generally between the first inner surface 127 and the second outer surface 129 of the cover layer 125, and may be fluidly connected to the channels 130. The hot gas flow 80 may flow past the second outer surface 129 of the cover layer 125 at a pressure generally lower than the pressure in the passages 140 and channels 130. This pressure differential may cause the cooling medium 90 flowing through the channels 130 to flow from the channels 130 into and through the exhaust passages 146 and exhaust from the exhaust passages 146 adjacent the second outer surface 129 of the cover layer 125. The cooling medium 90 may exhaust from the exhaust passages 146 adjacent or into the path of hot gas flow 80. Thus, in one embodiment, the cooling medium 90 exhausted from the exhaust passages 146 may form a cooling film adjacent the hot gas path component 100, such as adjacent the second outer surface 129 of the cover layer 125, and may provide film cooling to the hot gas path component. It should be understood that each channel 130 may be connected to one or more of the exhaust passages 146. It should further be understood that the exhaust passages 146 may be oriented at any angle with respect to the channels 130. Additionally, it should be understood that the exhaust passages 146 may have generally circular or oval cross-sections, generally rectangular cross-sections, generally triangular cross-sections, or may have any other suitable shaped polygonal cross-sections.

Alternatively, the cooling medium 90 may be exhausted directly from the channels 130. For example, the hot gas path component 100 may include a tip portion, and the channels 130 may be fluidly connected to the tip portion. The cooling medium 90 may flow directly from the channels 130 out through the tip portion adjacent or into the path of hot gas flow 80.

The component layer 120 and the cover layer 125 may each comprise a singular material, such as a substrate or a coating, or may each comprise a plurality of materials, such as a plurality of substrates and coatings. For example, in one exemplary embodiment as shown in FIGS. 2, 4, 5, 6, and 7, the component layer 120 may comprise a component substrate 150. Substrate materials 150 typically used in hot gas path components 100 may be, for example, nickel-, cobalt-, or iron-based superalloys. The alloys may be cast or wrought superalloys. It should be understood that the component substrate 150 of the present disclosure is not limited to the above materials, but may be any material used in any hot gas path component.

Further, as shown in FIG. 2, the cover layer 125 may comprise a metal coating 152. In one exemplary aspect of an embodiment, the metal coating 152 may be any metal or metal alloy based coating, such as, for example, a nickel-, cobalt-, iron-, zinc-, or copper-based coating.

Alternatively, the cover layer 125 may comprise a bond coating 154. The bond coating 154 may be any appropriate bonding material. For example, the bond coating 154 may have the chemical composition MCrAl(X), where M is an element selected from the group consisting of Fe, Co and Ni and combinations thereof, and (X) is an element selected from the group consisting of gamma prime formers, solid solution strengtheners, consisting of, for example, Ta, Re and reactive elements, such as Y, Zr, Hf, Si, and grain boundary strengtheners consisting of B, C and combinations thereof. The bond coating 154 may be applied to the hot gas path component 100 through, for example, a physical vapor deposition process such as electron beam evaporation, ion-plasma arc evaporation, or sputtering, or a thermal spray process such as air plasma spray, high velocity oxy-fuel or low pressure plasma spray. Alternatively, the bond coating 154 may be a diffusion aluminide bond coating, such as a coating having the chemical composition NiAl or PtAl, and the bond coating 154 may be applied to the hot gas path component 100 through, for example, vapor phase aluminiding or chemical vapor deposition.

Alternatively, the cover layer 125 may comprise a thermal barrier coating ("TBC") 156. The TBC 156 may be any appropriate thermal barrier material. For example, the TBC 156 may be yttria-stabilized zirconia, and may be applied to the hot gas path component 100 through a physical vapor deposition process or thermal spray process. Alternatively, the TBC 156 may be a ceramic, such as, for example, a thin layer of zirconia modified by other refractory oxides such as oxides formed from Group IV, V and VI elements or oxides modified by Lanthanide series elements such as La, Nd, Gd, Yb and the like.

In other exemplary embodiments, as discussed above, the component layer 120 and the cover layer 125 may each comprise a plurality of materials, such as a plurality of substrates and coatings. For example, in one embodiment as shown in FIG. 8, the component layer 120 may comprise a component substrate 150 and a bond coating 154. The component substrate 150 may include the first inner layer 122, and the bond coating 154 may include the second outer layer 124. Thus, the plurality of channels 130 may be defined in the bond coating 154. Further, as shown in FIG. 8, the cover layer 125 may comprise a TBC 156.

In another embodiment as shown in FIG. 9, the component layer 120 may comprise a component substrate 150, a bond coating 154, and a first TBC 156. The component substrate 150 may include the first inner layer 122, and the first TBC 156 may include the second outer layer 124. Thus, the plurality of channels 130 may be defined in the first TBC 156. Further, as shown in FIG. 9, the cover layer 125 may comprise a second TBC 158.

Additionally, as shown in FIG. 2, the cooling system 110 may include a TBC 156 disposed adjacent the cover layer 125. Further, as shown in FIG. 2, the cooling system 110 may include a bond coating 154 disposed between the TBC 156 and the cover layer 125. Alternately, the cover layer 125 may include the metal coating 152, the bond coating 154, and the TBC 156.

By utilizing channels 130 and passages 140 as described herein, the cooling system 110 of the present disclosure provides cooling of a hot gas path component 100 at a high heat transfer rate and with a relatively uniform temperature profile. Thus, the cooling system 110 of the present disclosure may increase the life of the hot gas path component 100 and allow the component 100 to be utilized in conjunction with higher temperature hot gas flows 80, thus increasing the performance and efficiency of the system 10.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooling system for a hot gas path component, the cooling system comprising:
   a component layer, the component layer including a first inner surface and a second outer surface, the second outer surface defining a plurality of channels, the component layer further defining a plurality of first passages extending generally between the first inner surface and the second outer surface, wherein each of the plurality of channels is directly and fluidly connected to at least one of the plurality of first passages, the component layer further defining a plurality of second passages, each of the plurality of second passages fluidly connected to one of the plurality of channels; and
   a cover layer, the cover layer situated adjacent the second outer surface of the component layer,
   wherein the plurality of first passages are configured to flow a cooling medium to the plurality of channels and provide impingement cooling to the cover layer, and
   wherein the plurality of channels are configured to flow cooling medium therethrough, cooling the cover layer, and wherein at least one of the plurality of second passages is configured to flow cooling medium from one of the plurality of channels and exhaust cooling medium adjacent the first the inner surface of the component layer.

2. The cooling system of claim 1, wherein the component layer comprises a component substrate.

3. The cooling system of claim 1, wherein the cover layer is one of a metal coating, a bond coating, or a thermal barrier coating.

4. The cooling system of claim 1, further comprising a thermal barrier coating disposed adjacent the cover layer.

5. The cooling system of claim 4, further comprising a bond coating disposed between the thermal barrier coating and the cover layer.

6. The cooling system of claim 1, wherein the component layer comprises a component substrate and a bond coating, and wherein the plurality of channels are defined in the bond coating.

7. The cooling system of claim 6, wherein the cover layer comprises a thermal barrier coating.

8. The cooling system of claim 1, wherein the component layer comprises a component substrate, a bond coating, and a first thermal barrier coating, and wherein the plurality of channels are defined in the first thermal barrier coating.

9. The cooling system of claim 8, wherein the cover layer comprises a second thermal barrier coating.

10. The cooling system of claim 1, further comprising at least one cooling circuit, the cooling circuit defined adjacent the first inner surface, and Wherein the plurality of passages are fluidly connected to the at least one cooling circuit.

11. The cooling system of claim 1, wherein the cover layer defines a plurality of exhaust passages, each of the plurality of exhaust passages fluidly connected to one of the plurality of channels and configured to flow cooling medium from the channel and exhaust cooling medium adjacent the cover layer.

12. The cooling system of claim 1, wherein cooling medium is exhausted directly from the plurality of channels.

13. The cooling system of claim 1, wherein each of the plurality of channels has a width and a length, and wherein the width of each of the plurality of channels is substantially constant throughout the length of the channel.

14. The cooling system of claim 1, wherein each of the plurality of channels has a width and a length, and wherein the width of each of the plurality of channels is tapered.

15. The cooling system of claim 1, wherein each of the plurality of channels has a depth and a length, and wherein the depth of each of the plurality of channels is substantially constant throughout the length of the channel.

16. The cooling system of claim 1, wherein each of the plurality of channels has a depth and a length, and wherein the depth of each of the plurality of channels is tapered.

17. The cooling system of claim 1, wherein each of the plurality of channels has a substantially smooth surface.

18. The cooling system of claim 1, wherein each of the plurality of channels has a surface that includes a plurality of surface features.

19. A cooling system for a hot gas path component, the cooling system comprising:
a component substrate, the component substrate including a first inner surface and a second outer surface, the second outer surface defining a plurality of channels, the component substrate further defining a plurality of first passages extending generally between the first inner surface and the second outer surface, wherein each of the plurality of channels is directly and fluidly connected to at least one of the plurality of first passages, the component layer further defining a plurality of second passages, each of the plurality, of second passages fluidly connected to one of the plurality of channels; and
a metal coating, the metal coating situated adjacent the second outer surface of the component substrate,
wherein the plurality of first passages are configured to flow a cooling medium to the plurality of channels and provide impingement cooling to the metal coating, and wherein the plurality of channels are configured to flow cooling medium therethrough, further cooling the metal coating, and wherein at least one of the plurality of second passages is configured to flow cooling medium from one Of the plurality of channels and exhaust cooling medium adjacent the first inner surface of the component layer.

* * * * *

UNITED STATES PATENT AND TRADEMARK OFFICE
CERTIFICATE OF CORRECTION

| | |
|---|---|
| PATENT NO. | : 8,651,805 B2 |
| APPLICATION NO. | : 12/765372 |
| DATED | : February 18, 2014 |
| INVENTOR(S) | : Benjamin Paul Lacy et al. |

It is certified that error appears in the above-identified patent and that said Letters Patent is hereby corrected as shown below:

In the Claims:

In claim 1, column 9, line 3, the second "the" should be deleted

In claim 10, column 9, line 29, the word "Wherein" should be uncapitalized

In claim 19, column 10, line 28, the "," after the word "plurality" should be deleted In claim 19, column 10, line 39, the world "Of" should be uncapitalized Signed and Sealed this
Seventh Day of October, 2014

Michelle K. Lee
*Deputy Director of the United States Patent and Trademark Office*